US008371702B2

(12) United States Patent
Macpherson

(10) Patent No.: US 8,371,702 B2
(45) Date of Patent: Feb. 12, 2013

(54) METHOD AND SYSTEM FOR DIGITAL LIGHT PROCESSING PROJECTION USING PULSED LAMPS

(75) Inventor: James B. Macpherson, Kitchener (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 615 days.

(21) Appl. No.: 12/564,150

(22) Filed: Sep. 22, 2009

(65) Prior Publication Data

US 2011/0069060 A1    Mar. 24, 2011

(51) Int. Cl.
*G03B 21/20*    (2006.01)
(52) U.S. Cl. ............... 353/85; 353/31; 353/99; 353/122; 348/742; 345/213
(58) Field of Classification Search ............ 353/30, 353/31, 33, 34, 84, 94, 121, 85, 99, 98, 122; 348/88, 742–745, 771, 806; 345/84, 108, 345/205, 208, 690–691, 581, 589, 617; 359/290, 359/291, 292, 295, 245, 248, 224, 846, 871
See application file for complete search history.

(56) References Cited

U.S. PATENT DOCUMENTS

| 5,657,099 | A | * | 8/1997 | Doherty et al. ............... 348/743 |
| 5,706,061 | A | * | 1/1998 | Marshall et al. .............. 348/743 |
| 6,002,452 | A | * | 12/1999 | Morgan ......................... 348/742 |
| 6,232,936 | B1 | * | 5/2001 | Gove et al. ...................... 345/85 |
| 6,332,693 | B1 | * | 12/2001 | Dove et al. ...................... 362/19 |
| 6,466,358 | B2 | * | 10/2002 | Tew .............................. 359/292 |
| 6,520,648 | B2 | * | 2/2003 | Stark et al. ...................... 353/85 |
| 6,590,549 | B1 | * | 7/2003 | Marshall ......................... 345/84 |
| 6,621,529 | B2 | * | 9/2003 | Ohara et al. .................. 348/743 |
| 7,226,172 | B2 | * | 6/2007 | Robinson ........................ 353/97 |
| 7,583,325 | B2 | * | 9/2009 | Peterson ....................... 348/745 |
| 7,884,988 | B2 | * | 2/2011 | Hewlett et al. ............. 359/224.1 |
| 2005/0200939 | A1 | * | 9/2005 | Huibers ........................ 359/290 |
| 2007/0097332 | A1 | | 5/2007 | Kubo |
| 2007/0139624 | A1 | * | 6/2007 | DeCusatis et al. .............. 353/84 |
| 2007/0171507 | A1 | | 7/2007 | Ishii et al. |
| 2008/0151195 | A1 | * | 6/2008 | Pacheco et al. ................. 353/30 |
| 2008/0158263 | A1 | * | 7/2008 | Hui et al. ...................... 345/690 |
| 2008/0273179 | A1 | | 11/2008 | Deppe et al. |
| 2009/0147223 | A1 | | 6/2009 | Deppe et al. |
| 2009/0195181 | A1 | | 8/2009 | Wolter |

FOREIGN PATENT DOCUMENTS

JP    2004212890 A    7/2004

OTHER PUBLICATIONS

European Patent Application No. 10176634.3 Search Report dated Oct. 8, 2010.

* cited by examiner

*Primary Examiner* — William C Dowling
*Assistant Examiner* — Sultan Chowdhury
(74) *Attorney, Agent, or Firm* — Stephen J. Perry; Perry+Currier Inc.

(57) ABSTRACT

A method of operating an AC mercury lamp and DMD (Digital Micromirror Device) in a projection system, comprising receiving a periodic video frame pulse signal, switching the DMD between successive on and off states during each period of the frame pulse signal, wherein each off state results in a dark interval, and driving the lamp with a signal that is synchronized to the video frame pulse signal so as to alternate between a maintenance pulse level during at least a portion of the dark interval and a plateau level during the on state of the DMD.

2 Claims, 4 Drawing Sheets

METHOD AND SYSTEM FOR DIGITAL LIGHT PROCESSING PROJECTION USING PULSED LAMPS

BACKGROUND OF THE INVENTION

The present invention is directed to Digital Light Processing (DLP) projection systems, and more particularly to a method and apparatus for synchronizing operation of an AC mercury lamp and DMD (Digital Micromirror Device) in a DLP projection System for 3D simulation.

Digital Light Processing (DLP) projection is based on the use of a source lamp, an illumination system, and a color splitting-recombining light engine. The optical function of the light engine is to split uniform illumination white light into Red/Green/Blue (RGB) channels, merging the three channels onto an imaging device or optical panel such as an LCD (Liquid Crystal Display) or DMD (Digital Micromirror Device), and then re-combining all three channels into a single illumination light beam that is projected onto a screen via a projection lens.

The DMD is an electromechanical device consisting of millions of microscopic mirrors that modulate light by independently flipping each mirror through a +−12 degree angle, between an "on" state for reflecting the source light to be viewed on screen and an "off" state for diverting the light to a light dump. Intermediate light intensities on screen are generated by toggling the DMDs according to a pulse width modulation (PWM) method, at frequencies above human perception in order to achieve time-averaged values. In this respect, the exact grey level produced depends on the dwell time of each "on" or "off" state.

PWM toggling of the DMDs must account for any time dependent changes in the source lamp brightness as the image is being rendered. Alternating Current (AC) mercury (Hg) lamps are one example of a light-source with very favourable properties, such as long life and high efficiency, but whose light output is not constant. These lamps typically have a step-like waveform consisting of a long, constant "plateau" level followed by a higher output-maintenance "pulse" that is used to improve lamp lifetime. The DMD "on" time must be inversely related to the "plateau" and "pulse" source lamp levels in order to provide a proper grey scale image on screen. This can represent a practical implementation challenge to the use of AC Hg lamps in DLP projection systems since each lamp model requires customized toggling patterns ("DMD bit sequences"), and a given lamp's AC waveform may even change over its lifetime, with a drifting ratio of pulse and plateau levels. Further, DMD speed limitations are such that it is not currently possible to correct AC lamp waveforms at the 90-120 Hz frame rates useful for 30 applications.

When used for 3D simulation, DLP projectors must be able to produce fixed intervals of darkness within each frame of video data, in addition to rendering an image. As indicated above, the DMD renders an image over a portion of the video frame period, and then spends the remaining time in the "off" state, which results in dark intervals between each rendered image. In 3D applications, this dark interval is used as a timing mask to hide the state transitions of the viewer's LCD eye shutters. If the dark interval is not present, any image on screen during the shutter transitions would be seen by both eyes, causing image artifacts. Inserting dark time requires that the image content be projected over a compressed time period, which can require unique bit sequences depending on how the lamp waveform scales relative to the image rendering period.

Accordingly, it is an objective of the present invention to address the complications and performance limitations set forth above of using pulsed lamp sources in DLP projectors used for 3D simulation.

SUMMARY OF THE INVENTION

Therefore, as set forth in greater detail below, a method and apparatus are set forth for synchronizing operation of an AC mercury lamp and DMD in a DLP projection system for 3D simulation. According to an exemplary embodiment, the source lamp is synchronized to the incoming video frame rate with an appropriate phase shift. The lamp pulses may be timed to occur during the dark interval. The "plateau" portion of the lamp output can then be treated as a constant output (DC) source while the lamp pulse is routed to the light dump. Therefore, images are rendered on the screen entirely during the lamp plateau portion using DMD switching patterns that are appropriate for use with a DC lamp, with an appropriate dark interval. This allows performance equivalent to DC lamp projectors, with only a few minor restrictions on setting of the dark interval.

These together with other aspects and advantages that will be subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
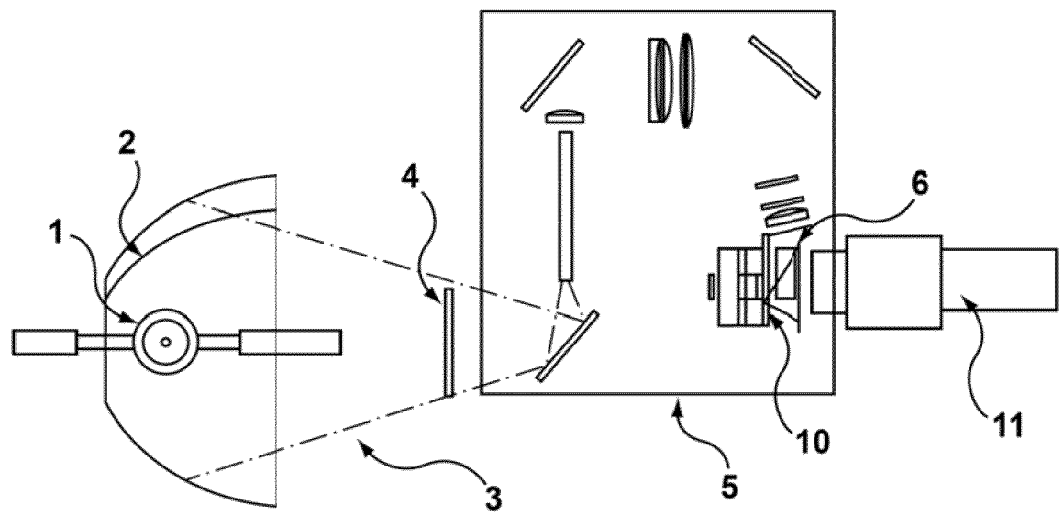
FIG. 1 is a block diagram of a DLP projector, according to the prior art.

FIG. 1 shows a DLP projector comprising a pulsed AC lamp (1) and parabolic reflector (2) for creating a light cone (3) that passes through a UV filter (4) into an illumination system (5), including an integrator rod and lenses for telecentric illumination. A light engine (6) includes a color splitting-converging prism (typically a plumbicon prism) with multiple prism elements and respective red channel, green channel and blue channel sub-assemblies (not shown). The prism elements contain dichroic coatings to separate the incoming white light into blue, green, and red. Each color is then separately modulated via DMD (10). Each DMD (10) reflects the modulated light, which is re-converged by the prism and projected by a projection lens (11) onto a screen to produce an image.

Figure 2:
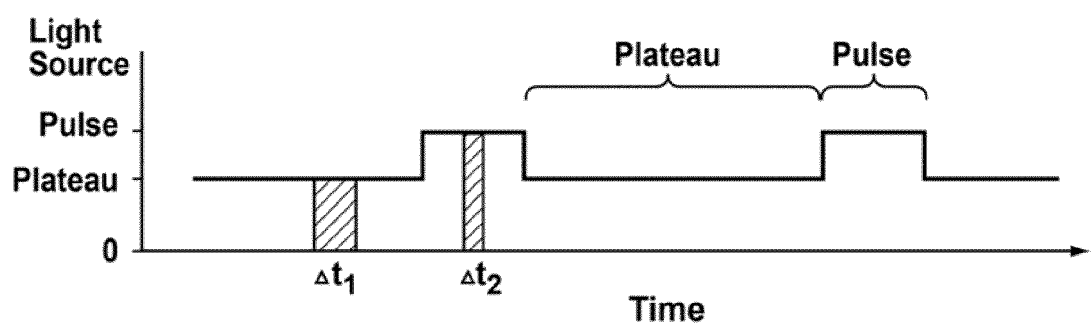
FIG. 2 is a timing diagram of a PWM signal for driving a pulsed AC lamp, according to the prior art.

As discussed above, when using AC mercury (Hg) lamps in DLP projectors the DMD "on" time must be inversely related to the "plateau" and "pulse" source lamp levels in order to provide a proper grey scale image on screen. This is depicted FIG. 2, which shows the PWM signal for driving a pulsed AC lamp. The shaded areas will produce equal units of brightness on screen only if the DMD on times $\Delta t_1$ and $\Delta t_2$ are inversely proportional to the plateau and pulse light levels respectively.

Figure 3:
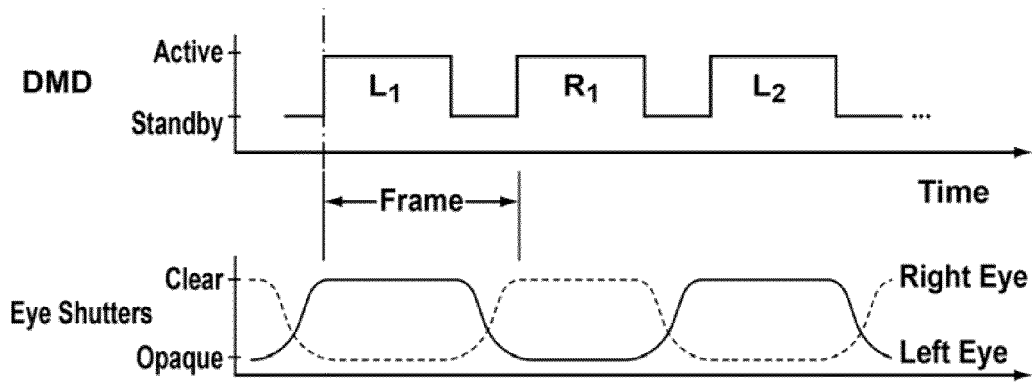
FIG. 3 depicts timing diagrams for driving a DMD and left and right 3D LCD eyeglass shutters, respectively, during dark intervals, according to the prior art.

Also as discussed above, the dark interval produced during the DMD "off" state is used as a timing mask in 3D applications to hide the state transitions of the viewer's LCD eye shutters, as shown in FIG. 3.

Figure 4:
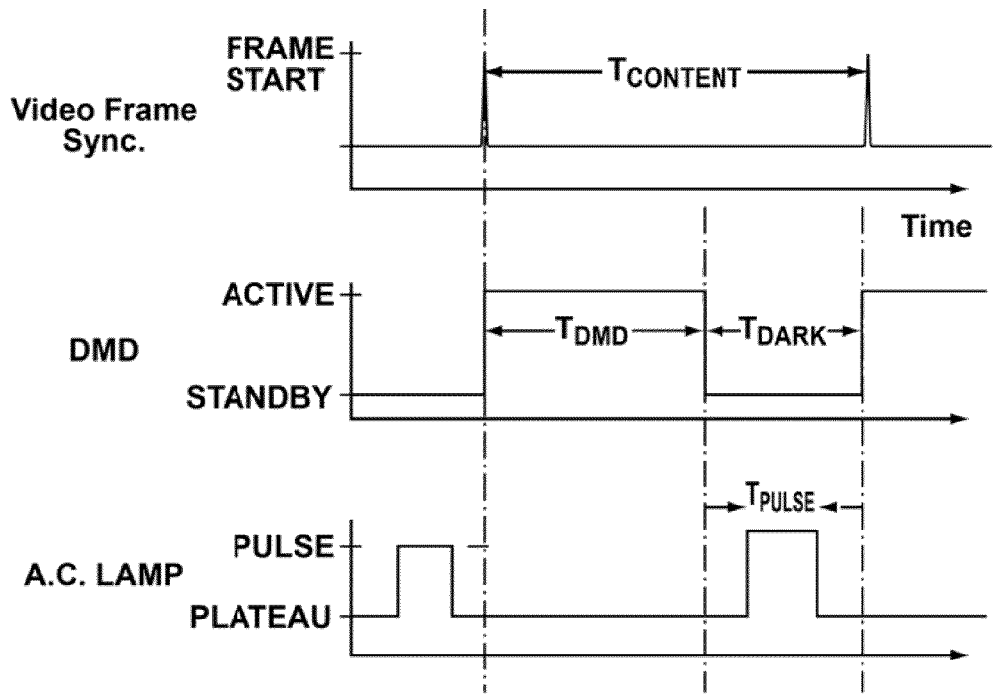
FIG. 4 depicts timing diagrams of PWM signals for driving a pulsed AC lamp and DMD synchronized to incoming video frame rate, according to an exemplary embodiment.

According to the exemplary embodiment of FIG. 4, operation of the AC mercury lamp (1) and DMD (10) are synchronized with the video frame pulse such that the maintenance pulse of the AC lamp is timed to occur during the dark interval and content is displayed during the lamp plateau in the same manner as if a DC lamp were being used. As illustrated, the DMD (10) is synchronized to the incoming video data with negligible phase difference, so that the DMD begins rendering the image frame as soon as the sync signal is received. The lamp (1) is independently synchronized to the video signal with a significant phase shift, chosen such that the lamp pulses occur during the DMD dark interval. Because all micromirrors are set to the off state during the dark interval, the pulse portion of the lamp waveform is rejected to the light dump. All image rendering takes place during the "plateau" portion of the lamp waveform, over which time interval the tight output is constant. DMD switching patterns appropriate for DC lamps can therefore be used, resulting in performance that is equivalent to DC lamp projectors subject only to the dark interval always being longer than the lamp pulse. While the DMD (10) and lamp (1) are each synchronized relative to the video signal in the illustrated embodiment, other arrangements are possible so long as the correct relative timing of dark interval and lamp pulse results.

Figure 5:
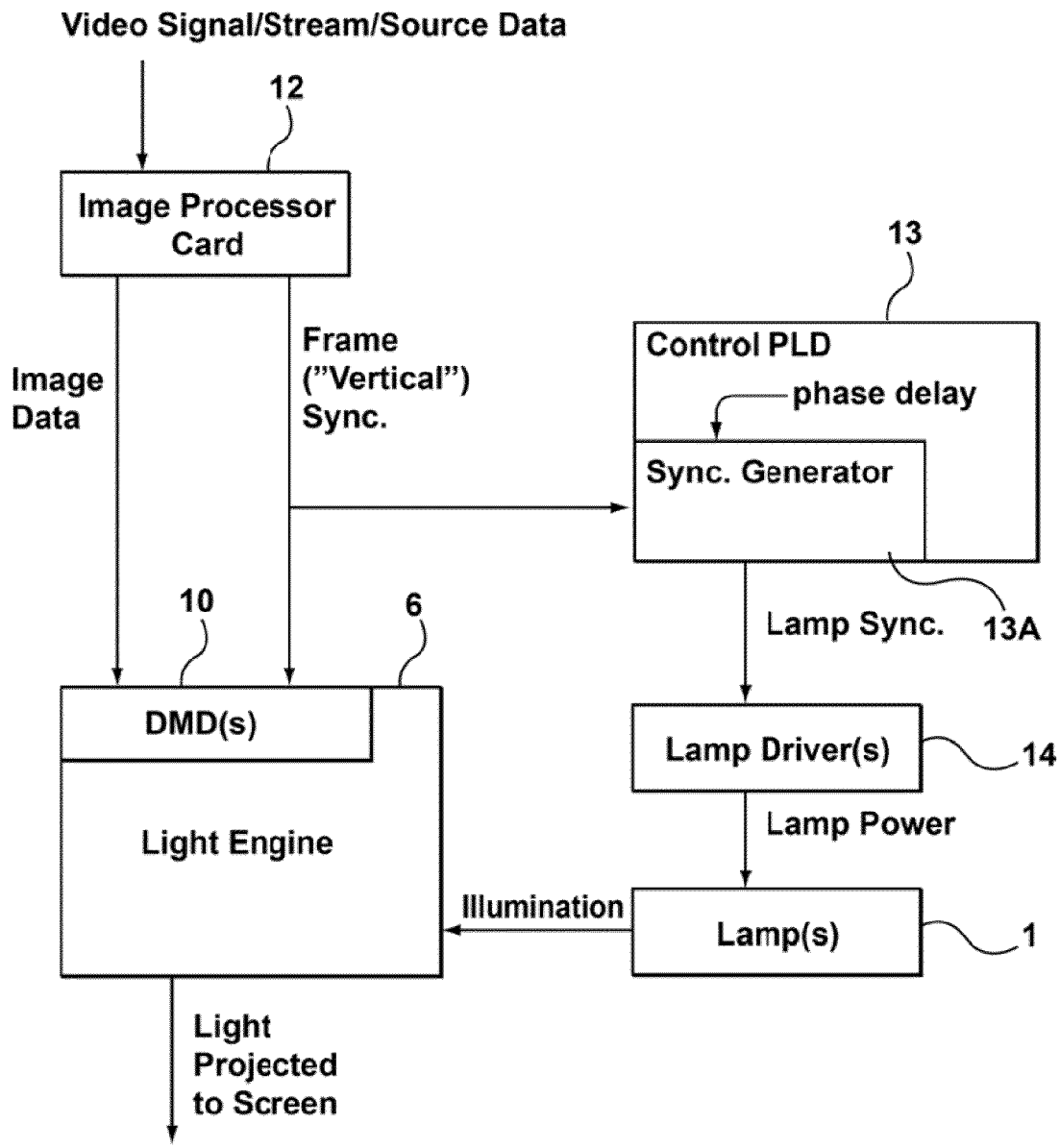
FIG. 5 is a block diagram of circuitry for synchronizing the signals depicted in FIG. 4, according to an exemplary embodiment.

As shown in FIG. 5, input video information in one of a variety of formats (e.g. video signal, video stream, video source data, etc.) is processed by an image processor (12) to form a series of image data blocks and a frame synchronization signal that coordinates the successive rendering of those image blocks by the DMD (10), or multiple DMD(s). The frame synchronization signal is also sent to a control Programmable Logic Device (13), or PLD, under control of software/firmware programming. The PLD (13) includes a sync generator (13A) for generating a periodic lamp synchronization signal with a desired phase delay. The required delay depends on frame rate and is determined from known properties of the DMD (10) and lamp (1). Typically, this information is stored in the PLD (13) in the form of a table for matching frame rate and signal delay. The signal delay may be set by identifying the incoming frame rate and referencing the look up table for the appropriate delay value. The lamp synchronization signal is sent to the lamp driver (14), or multiple drivers, that power the lamp (1) with the desired timing. The light output of the lamp (1), or multiple lamps, is carried through an illumination relay to light the DMDs (10) in the light engine (6), which then projects an image to a screen via the projection lens (11).

The synchronization method and apparatus set forth above have been found to be advantageous for several reasons. First, AC mercury lamps operate at frequencies encompassing 3D frame rates, typically 90 Hz or greater. This makes a 1:1 matching of lamp frequency and video rate practical. Second, the requirement that the minimum dark time be longer than the maintenance pulse is acceptable in practice since the maintenance pulse is typically only 10% of the lamp period, which is much shorter than the required dark intervals. Third, there is little brightness lost by rejecting the pulse portion of the lamp waveform to the light dump, relative to use with a DC source. Lamp plateau levels are typically 95% of the average light level, so that a pulse dumping system has approximately 5% less brightness than an equivalent projector using DC lamps of the same average power. This brightness loss can be compensated by the fact that AC mercury lamps are much more efficient than most DC sources.

Figure 6A:
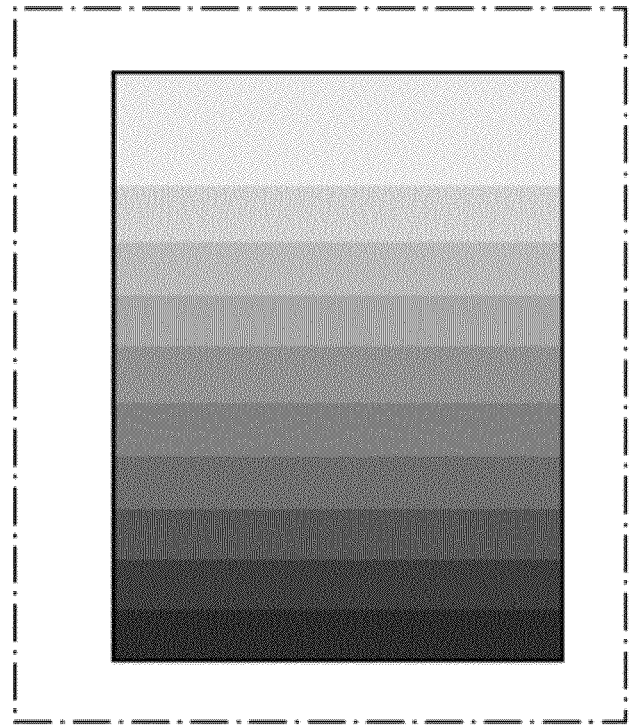
FIGS. 6A and 6B show projected grey scale images produced by a DLP projector without the synchronization depicted in FIG. 4 (FIG. 6A) and with the synchronization depicted in FIG. 4 (FIG. 6B).
Figure 6B:
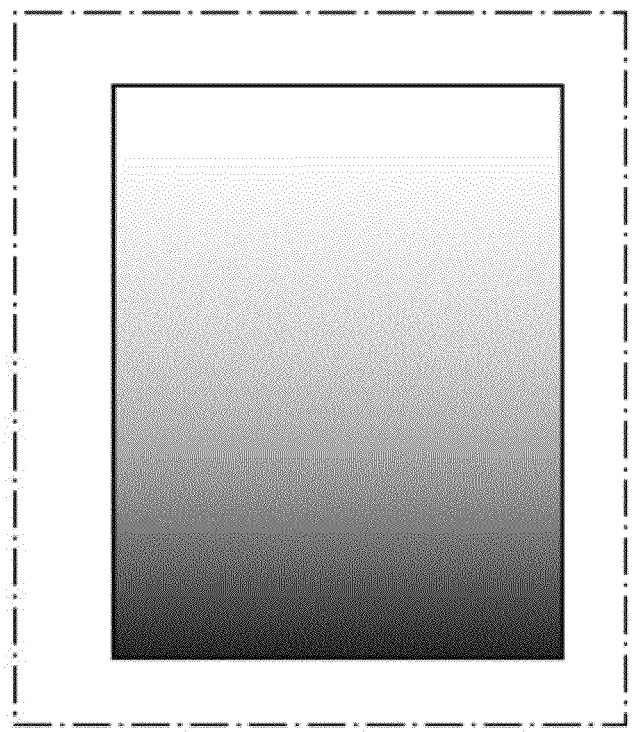

As shown in FIG. 6A, asynchronous operation leads to image artifacts in which multiple, pronounced discontinuities of the grey scale appear and disappear on a sub second time scale. These discontinuities in grey scale cannot be eliminated by adjusting DMD PWM. By way of contrast, synchronization with the lamp pulse outside of the dark interval, as provided by the exemplary embodiment set forth herein, results in a grey scale image that exhibits a continuous gradient and is stable over time, as shown in FIG. 6B.

The many features and advantages of the invention are apparent from the description above. It is intended by the appended claims to cover all such features and advantages. Further, since numerous modifications and changes will readily occur to those skilled in the art, it is not desired to limit the invention to the exact construction and operation illustrated and described, and accordingly all suitable modifications and equivalents may be resorted to, falling within the scope of the claims. For example, the pulse dumping technique described herein can be applied to regular (non-3D) video display as well, taking into consideration the brightness drop associated with the dark interval. In this case, lamps may not run at a low enough frequency to match the incoming video frame rates, so slightly different arrangements must be used. For example, the incoming video images can each be shown twice, thereby doubling the actual display frame rate to within the frequency range of the lamp. The principle remains the same however, that image rendering takes place entirely within the lamp plateau and uses a DC lamp PWM driving signal. This and other such modifications and alternatives are believed to be within the scope of the appended claims.

What is claimed is:

1. A circuit for operating an AC mercury lamp and DMD (Digital Micromirror Device) in a projection system, comprising:
   an image processor for receiving input video information and in response outputting a series of image data blocks and a frame synchronization signal for switching said DMD between image rendering and standby states, wherein each of said standby states results in a dark interval;
   a control device for receiving said frame synchronization signal and in response outputting a periodic lamp synchronization signal with a predetermined phase delay that is dependent on frame rate of said frame synchronization signal and predetermined properties of said DMD and said AC mercury lamp;
   at least one lamp driver for receiving said lamp synchronization signal and outputting a power signal for driving said lamp so as to alternate between a maintenance pulse level during at least a portion of said dark interval and a plateau level during said image rendering states of said DMD.

2. The circuit of claim 1, wherein said control device includes a look-up table for setting said phase delay based on said frame rate to phase delay.

* * * * *